3,428,151
TRACTION DEVICE FOR AUTOMOTIVE VEHICLES
Theodore P. Franklin, 203 3rd St.,
Towanda, Pa. 18848
Continuation-in-part of application Ser. No. 496,544,
Oct. 15, 1965. This application Oct. 26, 1967, Ser.
No. 683,076
U.S. Cl. 188—4                                               5 Claims
Int. Cl. B60t *1/00, 1/14*

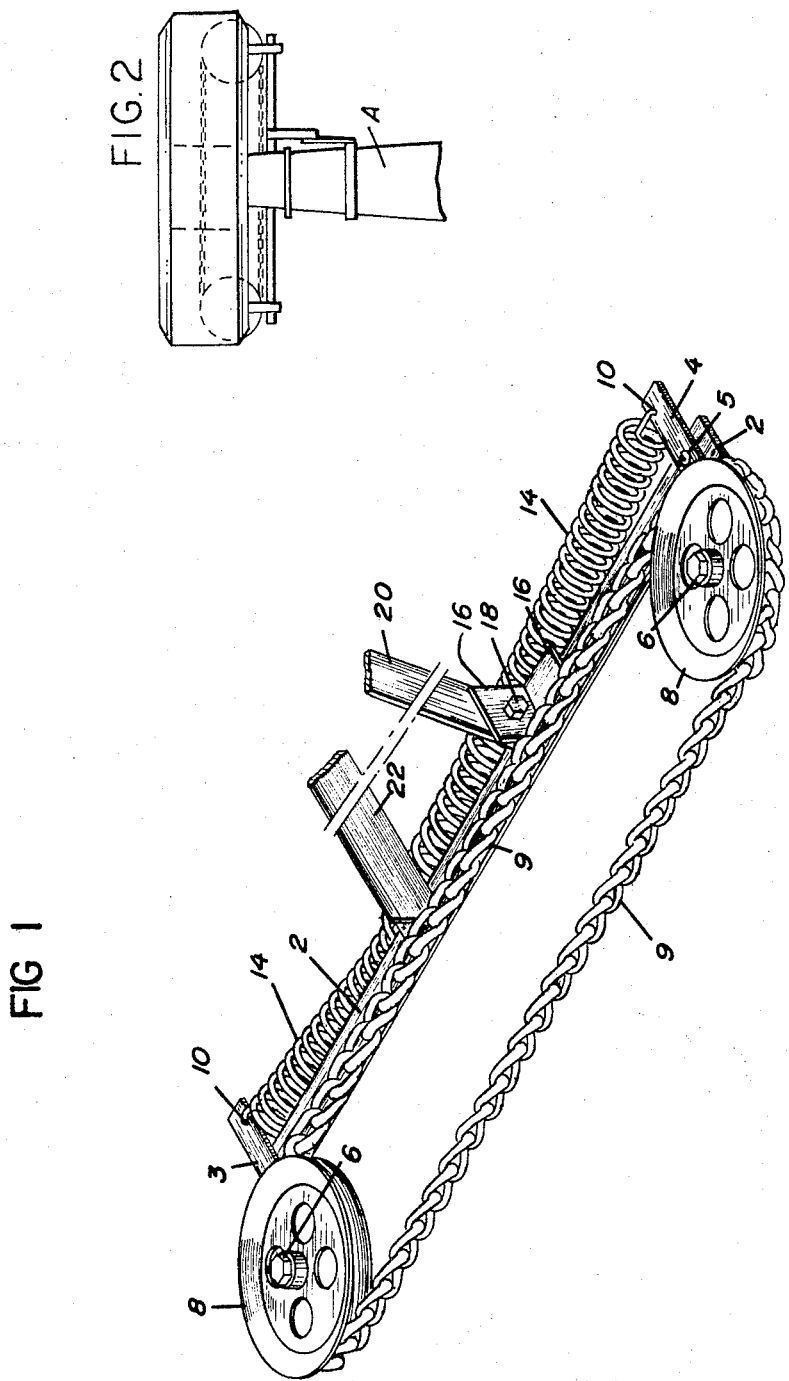

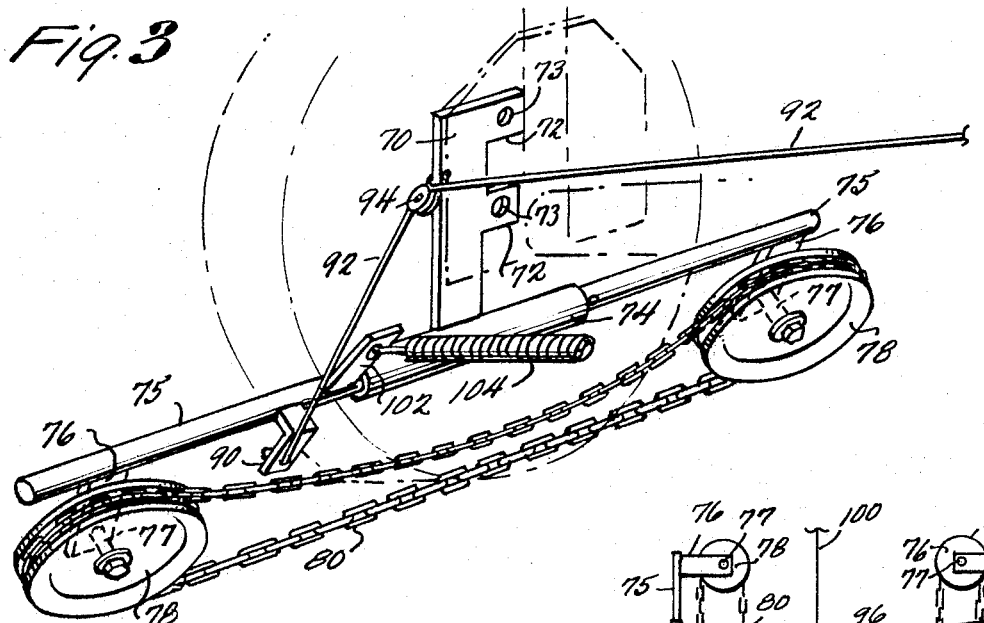

ABSTRACT OF THE DISCLOSURE

The present invention provides a frame extending in substantial parallelism with the longitudinal centerline of the vehicle and carrying a pair of grooved pulleys with an anti-skid chain trained therearound, together with means for so positioning the frame that the anti-skid chain will underlie the vehicle wheel and extend in the direction of movement of the vehicle when in operation, and means for retracting the frame and its associated elements into a position where it can in no way interfere with the operation of the vehicle.

---

This invention relates to devices for temporarily increasing the tractive effect of the driving wheels of automotive vehicles, particularly when on ice, snow or mud; and the present invention is a continuation-in-part of my patent application Ser. No. 496,544, filed Oct. 15, 1965 now abandned.

Some of the devices of the known prior art provide devices for temporarily increasing the tractive effect of the driving wheels of automotive vehicles which are mounted underneath the vehicle and adapted for movement into and out of operative position; and some of these prior art devices comprise pieces of ordinary tire chain which are thrown by centrifugal force between the roadway and the undersurface of the tire on the adjacent wheel.

Other devices of the prior art utilize discs with traction increasing surfaces which are adapted to be partially moved edgewise beneath the vehicle tire.

So far as I am aware all of the prior art devices of the type referred to are characterized by one or more serious shortcomings, including ineffectiveness for their intended purpose, lack of durability, prohibitive cost, etc.

It is among the objects of the present invention to provide a device for temporarily increasing the tractive effect of the driving wheels of automotive vehicles which is highly efficient for its intended purpose, durable in service, and easy and inexpensive to manufacture, install and maintain.

Another object is the attainment of the foregoing advantages in a device which may be quickly and easily installed on automotive vehicles of existing design.

Still another object of the invention is to provide a simplified traction-increasing device which is mounted adjacent one of the driving wheels of an automotive vehicle and which is adapted to be easily swung into and out of operative position, as desired; said traction-increasing device comprising, as indicated earlier herein, an endless section of anti-skid chain which when in operative position is adapted to underlie the tire on the driving wheel and be moved thereby in a direction which is longitudinal of the vehicle, as distinguished from cross-wise with respect thereto.

A further object is the attainment of the foregoing objectives with a device which has comparatively few movable parts, is relatively free from rattling and other objectionable characteristics, and which, when in retracted position, can in no way interfere with the operation of the vehicle.

All of the foregoing objects and advantages I accomplish by means of such structure and relative arrangement of parts thereof as will more fully appear from the following description, taken in connection with the annexed drawings wherein like reference numerals designate like parts and wherein:

FIGURE 1 is a perspective view illustrating the main body portion of a form of apparatus which embodies the teachings of the present invention, FIGURE 2 is a fragmentary plan view on a reduced scale of the apparatus of FIGURE 1 as installed on an automotive vehicle and in operative relationship with respect thereto.

FIGURE 3 is a fragmentary perspective view illustrating a modified form of the invention, and including a combination of elements which may be satisfactorily employed for moving the main body portion into and out of operative position, FIGURE 4 is an end elevational view of the apparatus of FIGURE 3; and FIGURE 5 is a schematic view further illustrating elements by means of which the traction device may be moved into and out of operative position.

Referring more particularly to the drawings, the numeral 2 designates the frame or main base member of the device of the invention which may, if desired, take the form of a metallic bar of rectangular cross-section.

Adjacent each end of the metallic bar 2 there is a stud or pin 4 which pivotally carries the intermediate portion of a transversely extending lever 5.

One of the extending ends of each of the levers 5 carries a stud or spindle 7 on which a peripherally grooved pulley 8 is mounted; and an endless chain 10 is strung between said pulleys.

The opposite ends of the transversely mounted levers 5 are provided with apertures 12 for receiving the hooked ends of a spring 15 which serves to suitably tension the endless chain 10.

As will be later described, the teachings of the present invention contemplate the mounting of the elements described hereinbefore beneath the vehicle and in such manner that the frame or main base member 2 may, when desired, be so moved that the lower and outer run of the endless chain 10 will take a position which is beneath the tire of the adjacent wheel and extending longitudinally of the path thereof.

When so disposed, the endless chain 10 is free to move with the undersurface of the tire; and is kept in such position by the freely rotatable (fore and aft) pulleys 8 on which it is mounted.

When the elongate frame member 2 is moved into its lowermost and operative position, the grooved and rotatably mounted pulleys 8 move into such a position that they occupy a plane which is at an angle of more than 90° with respect to the ground; and the lower and outer run of the endless anti-skid chain 9 is moved into contact with the inner and lowermost portion of the driving wheel A. The rotational movement of this portion of the driving wheel A pulls the endless anti-skid chain downwardly beneath it and tangentially thereto in a fore and aft direction.

In such a position the lower and outer run of the endless anti-skid chain 9 greatly increases the tractive effect of the driving wheel.

It will, of course, be understood that various types of apparatus may be employed for moving the frame 2 and the endless anti-skid chain 10 which is carried thereby from the elevated position beneath the motor vehicle and substantially above the lowermost portion of the drive wheel into the downward and outward position whereby the endless anti-skid chain underlies and is tangent to the drive wheel.

Referring to FIGURE 1, somewhat adjacent to, but spaced from, the middle of the metallic bar 2 an angle 16 is welded or otherwise secured to the upper face thereof, the said angle including a right-angular portion carrying a bolt 18 which extends therethrough and pivotally supports an upwardly extending arm 20.

An upwardly extending angle iron 22 is welded or otherwise secured to the upper face of the metallic bar 2 relatively adjacent to, but spaced from, the angle 16.

As indicated hereinbefore, any suitable means for lowering and raising the elements into and out of operative position may be connected to the upwardly extending pivotally mounted supporting arm 20 and angle-iron 22.

The operative position of the apparatus with respect to the left-hand driving wheel of the vehicle is illustrated at A in FIGURE 2; and it will be understood that a similar traction increasing device or apparatus is provided for the right-hand driving wheel of the vehicle.

Either of these devices may be manually moved into or out of operative position independently of the other.

On the other hand, it is contemplated that both devices be simultaneously moved into and out of operative position as will be described hereinafter.

Referring to FIGURES 3, 4 and 5, a modified form of the invention is shown as comprising a vertically disposed bracket 70 which is provided with a pair of right angularly extending lugs 72 which are fastened to a suitable portion of the undercarriage of the vehicle by bolts 73.

Secured to the lower end of the vertically disposed bracket 70 is a substantially horizontally extending tube 74 having an elongate rod or pipe 75 slidably disposed therein. As shown, the rod or pipe 75 is of considerably greater length than the horizontally extending tube 74, and it is provided adjacent each of its ends with a right angularly extending lug 76, the said lugs being of similar shape and size and occupying a common plane. Adjacent its outer end each of the lugs 76 carries a right angularly extending spindle 77 having a peripherally grooved pulley 78 rotatably mounted thereon. An endless chain 70 is strung between the peripherally grooved pulleys 78 much in the same manner as the endless chain 10 is strung between the peripherally grooved pulleys 8 of FIGURES 1 through 4.

Referring particularly to FIGURE 3, that portion of the rod or pipe 75 which projects from the rearward end of the horizontally extending tube 74 is provided with a right-angularly extending L-shaped arm 90, the longer portion of which extends downwardly and outwardly with respect to the vehicle; and to this portion of the L-shaped arm 90 there is connected one end of a flexible cable 92. This flexible cable 92 extends around a pulley 94 which is carried by the vertically disposed bracket 70 and then inwardly to be connected at its other end to one arm of a horizontally disposed intermediately pivoted lever 96.

This horizontally disposed intermediately pivoted lever 96 is secured to the underside of the floor of the vehicle with its opposite arms extending outwardly as shown in FIGURE 6.

The flexible cable 92 of the traction increasing device on the opposite side of the vehicle is connected to the other arm of the horizontally disposed intermediately pivoted lever 96.

Secured to the mid-portion of the horizontally disposed intermediately pivoted lever 96 is a right-angularly extending arm 98.

A flexible cable 100 is secured at one end to the right-angularly extending arm 98 of the intermediately pivoted lever 96, and its other end is connected to a lever (not shown) which is mounted for convenient manipulation by the operator of the vehicle.

From the foregoing construction and arrangement, it will be observed that movement by the operator of the vehicle of the flexible cable 100 in a forward direction will result in the retraction or elevation of the peripherally grooved pulleys 78 and endless chain 80 inwardly and upwardly with respect to the undercarriage of the vehicle. By appropriate positioning of the bracket 70 and right angularly extending tube 74 which is secured to the bottom thereof, the elements carried by the rod or tube 75 may be so retracted as to in no way interfere with the operation of the vehicle when the traction increasing apparatus of the invention is not in use.

Ordinarily, the weight of the spindles 77, peripherally grooved pulleys 78, and endless chain 80, which are carried by the lug 76, is adequate to cause the downward gravitational movement thereof into position where the endless chain 80 will be operatively associated with the bottom of the periphery of the adjacent exposed tire.

In order to assist the movement of the endless chain 80 into operative position and to maintain the same thereat during the time it is in operation the rod or pipe 75 is provided with a right angularly extending arm 102 which is resiliently influenced toward the longitudinal center line of the vehicle by a tension spring 104, the inner end of which is connected to an ear 105 which is secured to the adjacent side of the differential housing.

Having thus described the invention, what I claim as new and desire to secure by Letters Patent is:

1. The combination with an automative vehicle having a driving wheel; of an elongate frame member disposed beneath the vehicle and inwardly of but adjacent to the driving wheel; a grooved pulley rotatably mounted on said elongate frame member adjacent each of its ends and in alignment with each other; an endless anti-skid chain trained around and carried by said grooved and rotatably mounted pulleys; a carriage mounted beneath said automotive vehicle for suspending said elongate frame member in such manner that said pulleys may be disposed in fore and aft relationship with respect to said driving wheel and occupying a plane which is at an angle of more than 90 degrees with respect to the ground whereby the lower and outer run of said endless anti-skid chain is moved into contact with the lowermost portion of said driving wheel and is pulled by the rotation of the latter downwardly beneath it and tangentially thereto in a fore and aft direction; said carriage being also operable to move said elongate frame member and the elements carried thereby upwardly and inwardly with respect to said driving wheel.

2. The combination of claim 1 wherein the carriage for suspending the frame and the endless anti-skid chain is secured to and carried by an adjacent portion of the axle housing of the automotive vehicle.

3. The combination of claim 1 wherein the carriage for suspending the frame and the endless anti-skid chain is power operated to move the same into and out of the positions aforesaid.

4. The combination of claim 1 together with means for resiliently influencing at least one of the grooved pulleys away from the other to thereby subject the endless anti-skid chain to tension.

5. The combination with an automotive vehicle having a driving wheel; of an elongate member disposed beneath the vehicle inwardly of the driving wheel and extending substantially longitudinally of the vehicle; substantially spaced lateral extensions carried by said elongate member; a grooved pulley rotatably mounted on the projecting end of each of said lateral extensions; an endless anti-skid chain trained around and carried by said grooved pulleys; means disposed beneath the automotive vehicle and adjacent said driving wheel for suspending said elongate member in such manner that said endless anti-skid chain extends in parallelism with the longitudinal center-line of the automotive vehicle; said means being operable to position said elongate member and said endless anti-skid chain beneath the automotive vehicle and substantially above the lowermost portion of the driving wheel; said means being also operative to swing said elongate member and said endless anti-skid chain in a downward and outward movement with the outer run only of said endless anti-skid chain underlying said driving wheel and extending tangentially thereof in a direction which is forwardly with respect to the automotive vehicle.

References Cited

UNITED STATES PATENTS 2,797,773   7/1957   Riland _____ 188—4

MILTON BUCHLER, *Primary Examiner.*

THOMAS W. BUCKMAN, *Assistant Examiner.*

U.S. Cl. X.R.

188—5